Oct. 14, 1924.　　　　　　　　　　　　　　　　　　1,511,831
J. L. FORCE
OIL FILTRATION DEVICE
Filed Oct. 31, 1923　　　3 Sheets-Sheet 3

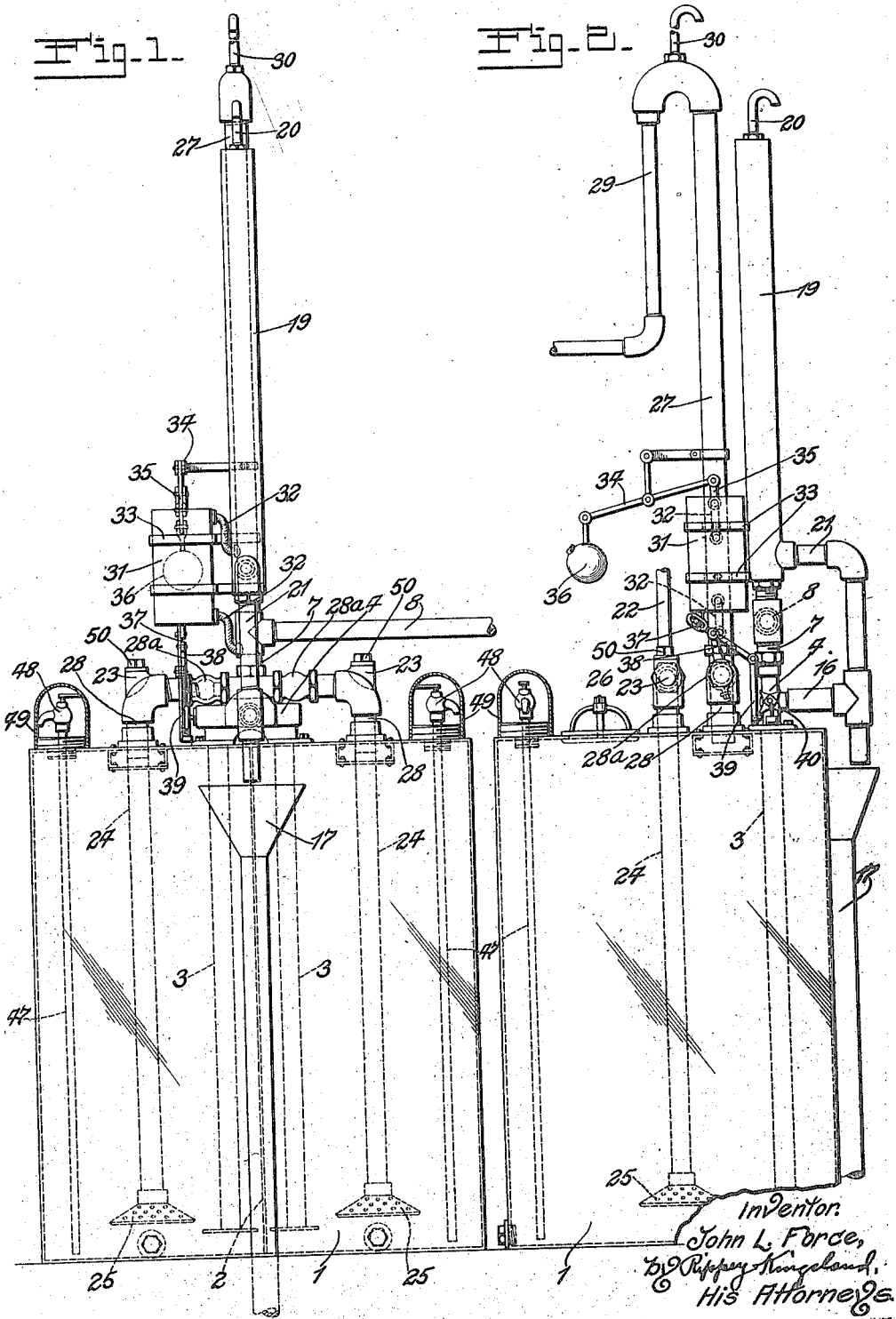

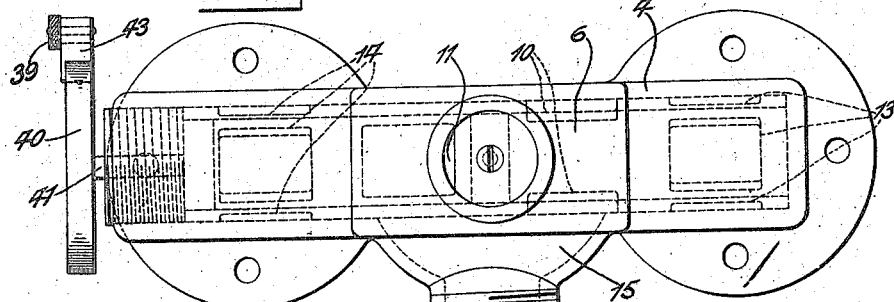
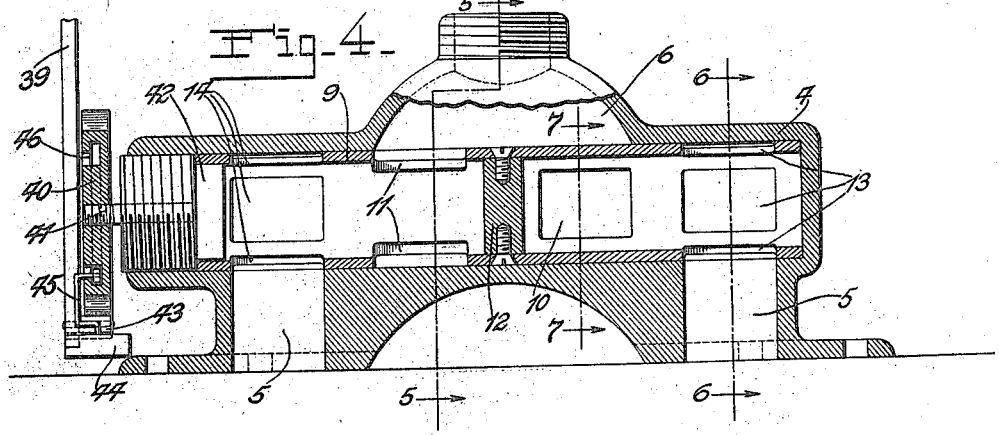
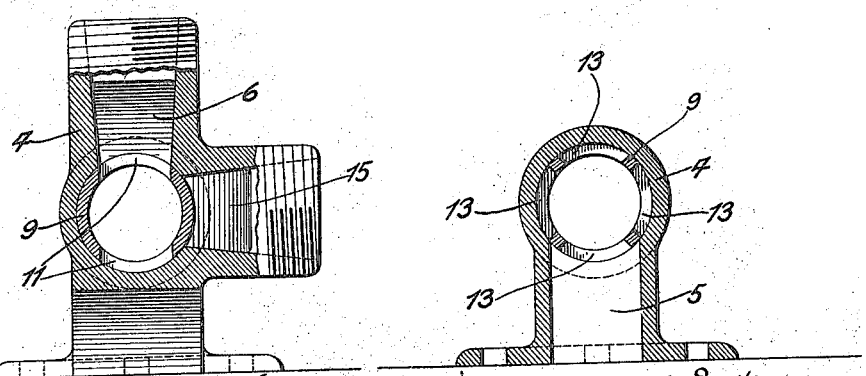
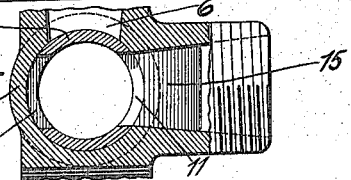

Inventor:
John L. Force,
by Rippey Kingsland,
His Attorneys.

Patented Oct. 14, 1924.

1,511,831

UNITED STATES PATENT OFFICE.

JOHN L. FORCE, OF ST. LOUIS, MISSOURI, ASSIGNOR OF ONE-HALF TO D. R. FRANCIS, JR., L. R. CARTER, AND W. H. HENBY, ALL OF ST. LOUIS, MISSOURI.

OIL-FILTRATION DEVICE.

Application filed October 31, 1923. Serial No. 671,895.

*To all whom it may concern:*

Be it known that I, JOHN L. FORCE, a citizen of the United States, residing at the city of St. Louis and State of Missouri, have invented a new and useful Improvement in Oil-Filtration Devices, of which the following is a specification.

This invention relates to oil filtration devices.

An object of the invention is to provide a new principle in filtering oil by having the oil rise out of the impurities it may contain rather than having these impurities settle out of the oil.

Another object of the invention is to provide a machine or filter to practice the principle of oil filtration described, to deliver the clean oil from the filter and to receive dirty oil into this filter for the purpose of filtration and delivery out of the filter.

Another object of this invention is to provide a filter of the class described equipped with a novel valve to govern the flow of water into and out of the filter and with a novel means of utilizing and controlling the power generated to operate this valve.

Another object of the invention is to provide in a machine of the class described an improved continuous force feed and circulating filtration system for the same use and of the same general character as above mentioned, having in addition the ability to feed filtered oil continuously to machinery equipped for a forced or stream feed circulating system, without other power than an adequate supply of water.

Another object of the invention is to provide a system of filtration to feed oil to the bearings or to the engine equipped for using such oil feed in a steady flow from the bottom upward, rather than from the top downward, thus enabling the filter compartment to be at the same level as the engine requiring the oil.

Other objects will appear from the following description reference being made to the drawings which illustrate the invention embodied in a filter of the class mentioned, and in which—

Fig. 1 is a rear elevation of the filter.

Fig. 2 is an end elevation.

Fig. 3 is an enlarged plan view of the valve mechanism controlling the admission and discharge of water into and from the filter.

Fig. 4 is a longitudinal sectional view of the valve mechanism.

Figs. 5, 6 and 7 are cross sectional views of the valve structure taken on the lines 5—5, and 6—6 and 7—7, respectively, of Fig. 4.

Figure 8:
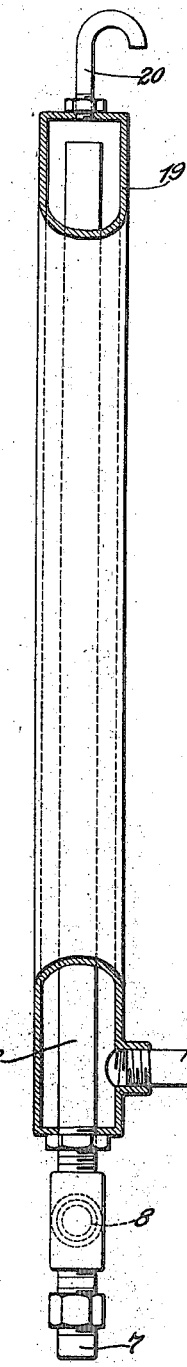

Fig. 8 is an enlarged view of a water head and overflow device in connection with the water power mechanism.

Figure 9:
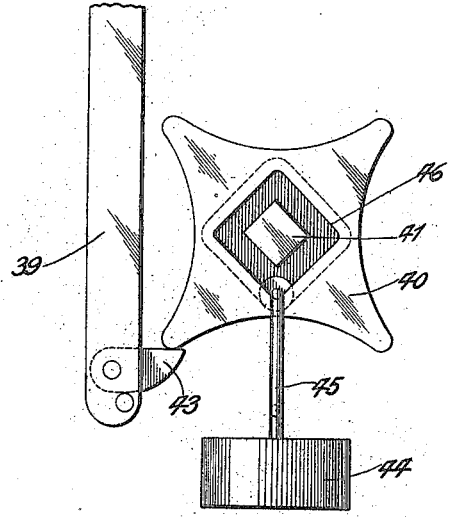

Fig. 9 is an enlarged view of the mechanism for operating the valve to control the flow of water into and out of the filter.

Figure 10:
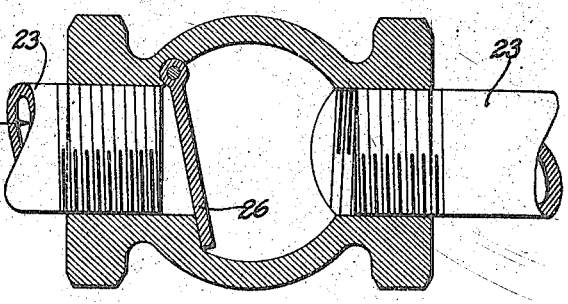

Fig. 10 is a sectional view of another valve included in the filter.

In the present embodiment of the invention which is designed specially to maintain a continuous force feed and circulating filtration of the oil, the tank 1 is divided into two laterally adjacent compartments by a vertical partition 2 extending from the bottom wall to the top wall of the tank. Both compartments of the tank are completely filled with liquid to the exclusion of all air. During the filtration process there are two strata of liquid in the compartment through which filtration is being made, the lower stratum being water and the upper stratum being oil which is supported at the top because it is lighter than the water. Water is admitted to the compartments separately through pipes 3 extending downwardly into said compartments and having their lower ends open within the compartments, respectively, and their upper ends opening into a valve housing 4 at the top of the compartments. The pipes 3 receive water from the valve housing 4 through ports 5 with which the upper ends of said pipes 3 communicate.

The valve housing 4 has a water receiving chamber 6 into which a pipe 7 opens, the same having connection with a water supply pipe 8 arranged to receive water under pressure from any suitable source of supply, as from a city water supply system. As stated, the valve housing 4 is in communication with each of the pipes 3 and the novel form of valve enclosed within the housing 4 is arranged so that water will be delivered to the two compartments of the filter alternately, but will not be delivered to the two compartments simultaneously.

The valve within the housing 4 comprises a tubular valve member 9 having a pair of influent ports 10 for one of the pipes 3 and a pair of influent ports 11 for the other pipes 3, the arrangement being such that when either one of the ports 10 is in position to receive water from the chamber 6 both of the influent ports 11 are out of communication with the chamber 6, and vice versa. A partition 12 within the valve 9 forms two non-communicating compartments into which the ports 10 and 11, respectively, open. The valve compartment into which the ports 10 open is provided with four ports 13, one of which is in communication with an adjacent port 5 in any of the adjusted positions of the valve. So, also, the valve chamber into which the ports 11 open is provided with four ports 14, one of which is in communication with the other port 5 in any of the adjusted positions of the valve. Thus it will be seen that water may be admitted to the two compartments of the filter alternately, but not simultaneously.

The valve housing 4 is provided on one side with a chamber 15 with which the ports 10 and 11, respectively, are alternately brought into communication. When both of the ports 10 are out of communication with the chamber 6 one of said ports 10 is in communication with the chamber 15, as is also the case with respect to the ports 11, although the ports 10 and 11 are never in communication with the chamber 15 at the same time. The chamber 15 opens into an overflow pipe 16 (Fig. 2) that discharges into an outlet 17.

The pipe 7 into which the water supply pipe 8 opens has a vertical extension 18 (Fig. 8) extending upwardly within a chamber 19 having an air inlet pipe 20 at its upper end. The water entering the filter under pressure through the supply pipe 8 rises into the pipe 18, and a part of the water flows out through the upper end of said pipe into the chamber 19 and thence out through a pipe 21 to the drain 17.

Oil is admitted to the two compartments in the tank 1 from the supply pipe 22 having branches 23 in communication with inlet pipes 24 extending downwardly into compartments in the tank and opening near the bottoms of said compartments and being provided on their lower ends with perforated baffles 25 which spread and scatter the oil entering the compartments.

Each of the branch pipes 23 is provided with a check valve 26 (Fig. 10) that will permit oil to pass through the branch pipes 23 into the pipes 24 but will prevent the oil from being forced back through the pipes 23 into the pipe 22. The oil thus delivered into the water near the bottoms of the compartments in the tank 1 rises through the water and is thereby washed and purified, the impurities being retained at the bottom by the water. As the oil enters a compartment at the bottom through a pipe 24 and rises to the top it expels an equal volume of water from the bottom of the tank through the pipe 3 and the outlet chamber 15 and pipe 16 therefrom.

Clean oil is fed to the engine from the top of the filter through a passage provided for that purpose. In the embodiment of the invention shown the passage comprises a pipe 27 extending some distance above the upper open end of the pipe 18 (Figs. 1 and 2) and having branches 28 at its lower end opening into the upper ends of the compartments in the tank 1. From the upper end of the pipe 27 a downwardly and laterally extended pipe 29 leads to the point of delivery of the clean oil, a syphon breaker 30 being provided at the curved connection between the upper end of the pipe 27 and the pipe 29. Each of the branch pipes 28 is provided with a check valve 28$^a$ that will permit oil to pass from the tank 1 but will prevent oil from returning to the tank from the pipe 27 by way of the pipes 28.

When all of the oil has been forced out of either compartment in the tank 1 the water rises into the pipe 27 through the connected branch pipe 28 that opens into the compartment receiving the water under pressure. A float device is provided in connection with the pipe 27 and is operated by the water rising into said pipe and is provided with connections for turning the valve 9 to position to stop the flow of water into the compartment in the tank from which all of the oil had been exhausted and to admit water into the other compartment in the tank 1, which, in the meantime, had received oil and in which oil had been filtering.

The float device may be of any appropriate form and in the embodiment shown comprises a receptacle 31 having flexible tubes 32 opening from its upper and lower ends into the pipe 27. When oil is being forced from either compartment through the pipe 27 the receptacle 31 is filled with oil and when all of the oil has been forced out of either receptacle as above described, the water rising into the pipe 27 forces the oil from the receptacle 31 and fills said receptacle with water. The receptacle 31 is mounted for vertical sliding movements in guides 33 and is provided with a counterbalance device whereby the receptacle is raised when filled with oil that is lighter than water and which permits the receptacle to move downwardly when it is filled with water which is heavier than oil. Obviously the oil will be forced out of the receptacle 31 through the upper flexible tube 32 when water enters the lower end of the receptacle through the lower flexible tube 32. The counterbalance comprises a lever 34 having one end pivotally connected with the receptacle 31 by links 35, and the opposite end provided with a hollow counter-balance 36 that may receive weight elements such as shot, or the like, to maintain the device in a condition for accurate operation. A lever 37 has one end pivoted to the lower end of the receptacle 31 and is pivotally supported intermediate of its ends on an arm 38 and supports a link 39 on its free end. The lower end of the link 39 swings adjacent to a four-toothed member 40 carried on a stem 41 (Figs. 3 and 4) extending from a plug 42 attached to and closing one end of the valve 9. The lower end of the link 39 has a detent 43 pivoted thereto and extending under the four-toothed member 40. Accordingly, when the receptacle 31 is lowered by the weight of the water, the link 39 is raised with the result that the valve 9 is turned to position to prevent water from flowing into the compartment in the tank 1 from which all of the oil had been exhausted and to admit water into the other compartment in the tank 1 which, in the meantime, had received a quantity of oil for filtration. The water rising in the pipe 27 and in the receptacle 31 cannot go higher than the top of the pipe 18. The oil now coming from the active compartment rises into the receptacle 31 and the pipe 27 and the water recedes through the oil to the bottom of the compartment from which the oil is flowing. The oil continues in uninterrupted flow from this now active compartment to the point of use, and, as before described, returns to the other or passage compartment as before described, and this operation is repeated each time that an active compartment is exhausted of oil.

When the receptacle 31 is free from water the counterbalance device raises the receptacle and retains it in elevated position when filled with oil. The link 39 is thereby moved downwardly to its lower position, the detent 43 escaping properly below the four-toothed member 40 for the next operation. To assist the link 39 and the detent 43 in operating the valve 9 and to complete the final movements of said valve in each operation a special device is provided. As shown (Figs. 4 and 9) said special device comprises a weight 44 suspended by an arm 45 engaging in a quadri-lateral groove 46 in the part 40. The arrangement is such that when the valve 9 is in any one of its proper adjustments the weight 44 is in its lowest position, and when said valve is out of its proper adjustment the weight 44 is supported above its lowermost position. Thus the weight 44 will act upon the valve and complete its final turning movement at each operation.

Each of the compartments in the tank 1 is provided with a pipe 47 extending downwardly through the top of the tank and having their lower open ends normally near the bottom of the tank. The pipes 47 are supported for vertical sliding movements through the top of the tank and their upper ends are equipped with valves 48 which may be opened to withdraw the settlings from the tank. By moving either of the pipes 47 vertically the depth of the water in either receptacle may be determined as also the amount of oil therein. In their lower positions the outer valve ends of the pipes 47 are enclosed by caps 49 having threaded engagement with the part through which the pipes 47 extend.

Provision is made whereby oil may be delivered into either compartment in the tank 1 and from a source other than the engine from which the oil is returned for filtration after use, as before described. Each of the branch pipes 23 is provided with a removable plug 50 (Figs. 1 and 2) between the valve 26 and the end of the pipe 23 that opens into the tank. Either plug 50 may be removed to provide an opening to receive the end of a pipe leading to a head or supply of oil at an appropriate height above the water outlet pipe 16. The oil thus passing into the compartment will displace an equal volume of water by forcing the water out through a pipe 3, the valve 9 and into the chamber 15 and outlet pipe 16. In this connection it is appropriate to state also that when oil is returned to the tank 1 for filtration such returned oil will not enter the pipes 3, because said pipes have their lower open ends below the ends of the pipes 24 and also the pipes 3 are filled with water, which arrangement prevents the oil from entering said pipes.

From the foregoing the operation of my improved filtration device is obvious and it will be seen that it accomplishes all of its intended objects and purposes in a highly efficient and satisfactory manner. Once in operation the device requires very little attention and care, since the control mechanism is operated automatically and as an incident to the use of the apparatus. I am aware that the invention may be varied in numerous particulars without departure from the nature and principle thereof, and I do not restrict myself unessentially, but what I claim and desire to secure by Letters Patent is:—

1. An oil filtration device, comprising a receptacle arranged to be filled entirely with liquid to the exclusion of air therefrom, a pipe for admitting oil into the receptacle and the liquid therein near the bottom thereof, a pipe opening into the top of the receptacle for conducting the oil therefrom, and means automatically and alternately admitting oil and another liquid into said receptacle.

2. An oil filtration device, comprising a pair of closed receptacles arranged to be filled with liquid to the exclusion of air, means for delivering oil into said receptacles respectively and alternately near the bottom of the liquid therein, and means for withdrawing oil from said receptacles alternately.

3. An oil filtration device, comprising a pair of closed receptacles arranged to be filled with liquid to the exclusion of air, means for delivering oil into said receptacles respectively and alternately near the bottom of the liquid therein, means for withdrawing oil from said receptacles alternately, and automatic means for effecting change in the withdrawal of oil from one of said receptacles to withdrawal of oil from the other receptacle.

4. An oil filtration device, comprising a pair of closed receptacles arranged to be filled with liquid to the exclusion of air, means for delivering oil into said receptacles respectively and alternately near the bottom of the liquid therein, means for withdrawing oil from said receptacles alternately, and automatic means for effecting change in the admission of oil to one of said receptacles to the admission of oil to the other receptacle.

5. An oil filtration device, comprising a pair of closed receptacles arranged to be filled with liquid to the exclusion of air, means for delivering oil into said receptacles respectively and alternately near the bottom of the liquid therein, means for withdrawing oil from said receptacles alternately, automatic means for effecting change in the withdrawal of oil from one of said receptacles to withdrawal of oil from the other receptacle, and automatic means for effecting change in the admission of oil to one of said receptacles to the admission of oil to the other receptacle.

6. An oil filtration device, comprising a closed receptacle arranged to be filled entirely with liquid to the exclusion of air, a pipe for admitting oil into the receptacle and the liquid therein near the bottom thereof, a baffle device at the open end of said pipe for scattering the oil passing from the pipe, and means for conducting from the receptacle a volume of the liquid equal to the volume of oil admitted thereto automatically and as an incident to the admission of said oil.

7. An oil filtration device, comprising a closed receptacle arranged to be filled entirely with liquid to the exclusion of air, a pipe for admitting oil into the receptacle and the liquid therein near the bottom thereof, a baffle device at the open end of said pipe for scattering the oil passing from the pipe, means for conducting from the receptacle a volume of the liquid equal to the volume of oil admitted thereto automatically and as an incident to the admission of said oil, and a pipe opening into the top of the receptacle for conducting oil therefrom that rises through the liquid in which the oil is admitted.

8. An oil filtration device, comprising a pair of closed receptacles arranged to be filled with liquid to the exclusion of air, pipes for delivering oil into said receptacles respectively and alternately near the bottom of the liquid therein, means for conducting from each receptacle a volume of liquid equal to the volume of oil admitted thereto, and means for withdrawing oil from said receptacles alternately.

9. An oil filtration device, comprising a pair of closed receptacles arranged to be filled with liquid to the exclusion of air, mechanism controlling the admission of liquid into said receptacles, means for delivering oil into said receptacles respectively and alternately near the bottom of the liquid therein, means for operating said mechanism to control the discharge of liquid from said receptacles in volumes equal to the volumes of oil admitted to said receptacles respectively, and means for withdrawing oil from said receptacles alternately.

10. An oil filtration device, comprising a pair of closed receptacles arranged to be filled with liquid to the exclusion of air, mechanism controlling the admission of liquid into said receptacles, means for delivering oil into said receptacles respectively and alternately near the bottom of the liquid therein, means for operating said mechanism to control the discharge of liquid from said receptacles in volumes equal to the volumes of oil admitted to said receptacles respectively, means for withdrawing oil from said receptacles alternately, and automatic means for effecting change in the withdrawal of oil from one of said receptacles to withdrawal of oil from the other receptacle.

11. An oil filtration device, comprising a pair of closed receptacles arranged to be filled with liquid to the exclusion of air, mechanism controlling the admission of liquid into said receptacles, means for delivering oil into said receptacles respectively and alternately near the bottom of the liquid therein, means for operating said mechanism to control the discharge of liquid from said receptacles in volumes equal to the volumes of oil admitted to said receptacles respectively, means for withdrawing oil from said receptacles alternately, and automatic means for effecting change in the admission of oil to one of said receptacles to the admission of oil to the other receptacle.

12. An oil filtration device, comprising a pair of closed receptacles arranged to be filled with liquid to the exclusion of air, mechanism controlling the admission of liquid into said receptacles, means for delivering oil into said receptacles respectively and alternately near the bottom of the liquid therein, means for operating said mechanism to control the discharge of liquid from said receptacles in volumes equal to the volume of oil admitted to said receptacles respectively, means for withdrawing oil from said receptacles alternately, automatic means for effecting change in the withdrawal of oil from one of said receptacles to withdrawal of oil from the other receptacle, and automatic means for effecting change in the admission of oil to one of said receptacles to the admission of oil to the other receptacle.

13. In an oil filtration device, a closed receptacle arranged to be filled with water to the exclusion of air, a valve controlling the admission of water to and the discharge of water from said receptacle, and means for admitting oil to said receptacle and thereby causing a discharge of water from said receptacle equal in volume to the volume of oil admitted.

14. In an oil filtration device, a closed receptacle arranged to be filled with water to the exclusion of air, a valve controlling the admission of water to and the discharge of water from said receptacle, means for admitting oil to said receptacle and thereby causing a discharge of water from said receptacle equal in volume to the volume of oil admitted, and means for operating said valve to and from position to admit water into said receptacle.

15. In an oil filtration device, a closed receptacle arranged to be filled with water to the exclusion of air, a valve controlling the admission of water to and the discharge of water from said receptacle, means for admitting oil to said receptacle and thereby causing a discharge of water from said receptacle equal in volume to the volume of oil admitted, and means for operating said valve to and from position to permit water to be discharged from said receptacle when oil is admitted to said receptacle.

16. In an oil filtration device, a closed receptacle arranged to be filled with water to the exclusion of air, a valve controlling the admission of water to and the discharge of water from said receptacle, means for admitting oil to said receptacle and thereby causing a discharge of water from said receptacle equal in volume to the volume of oil admitted, means for operating said valve to and from position to permit water to be discharged from said receptacle automatically and as an incident to admission of oil to said receptacle.

17. In an oil filtration device, a pair of closed receptacles arranged to be filled with water to the exclusion of air, a valve for controlling the admission of water to and the discharge of water from said receptacles, mechanism for operating said valve to position to admit water to said receptacles alternately and to permit water to be discharged from said receptacles alternately, means for admitting oil into the receptacle from which the valve permits water to be discharged to cause the discharge of a volume of water therefrom equal to the volume of oil admitted thereto, and means for withdrawing oil from said receptacles alternately.

18. An oil filtration device, comprising a pair of closed receptacles arranged to be filled with water to the exclusion of air, a valve controlling the admission of water to and the discharge of water from said receptacles, means for admitting oil into said receptacles alternately, means for withdrawing oil from said receptacles alternately the oil being withdrawn from one receptacle while being admitted to the other, and means for operating said valve automatically and as an incident to the exhaustion of oil from one receptacle to permit discharge of water from the receptacle from which the oil is exhausted.

19. An oil filtration device, comprising a pair of closed receptacles arranged to be filled with water to the exclusion of air, a valve controlling the admission of water to and the discharge of water from said receptacles, means for admitting oil into said receptacles alternately, means for withdrawing oil from said receptacles alternately the oil being withdrawn from one receptacle while being admitted to the other, means for operating said valve automatically and as an incident to the exhaustion of oil from one receptacle to permit discharge of water from the receptacle from which the oil is exhausted, and means for admitting oil to said last named receptacle and discharging therefrom a volume of water equal to the volume of oil admitted.

20. In a circulating oil filtration device, a pair of closed receptacles arranged to be filled with water to the exclusion of air, a device controlling the admission of water to said receptacles alternately, means for admitting oil to said receptacles alternately, means for permitting discharge from said receptacles of water equal in volume to the volume of oil admitted as aforesaid, and piping for conducting said oil in circulation from said receptacles to a point of use and from the point of use to said receptacles.

21. In a circulating oil filtration device, a pair of closed receptacles arranged to be filled with water to the exclusion of air, a device controlling the admission of water to said receptacles alternately, means for admitting oil to said receptacles alternately, means for permitting discharge from said receptacles of water equal in volume to the volume of oil admitted as aforesaid, piping for conducting said oil in circulation from said receptacles to a point of use and from the point of use to said receptacles, and means for controlling admission of said oil from said piping into said receptacles alternately.

22. In an oil filtration device, a closed receptacle arranged to be filled with water to the exclusion of air, a valve controlling the admission of water to and the discharge of water from said receptacle, means for admitting oil to said receptacle and thereby causing the discharge of water from said receptacle equal to the volume of oil admitted, a pipe for conducting oil from the receptacle to a point of use, and means for preventing the water from passing from the receptacle to the point of use of the oil.

23. In an oil filtration device, a closed receptacle arranged to be filled with water to the exclusion of air, a valve controlling the admission of water to and discharge of water from said receptacle, means for admitting oil to said receptacle and thereby causing the discharge of water from said receptacle equal to the volume of oil admitted, and means for controlling said valve to maintain the desired feed pressure of water to force the oil toward the point of use.

24. In an oil filtration device, a closed receptacle arranged to be filled with water to the exclusion of air, a valve controlling the admission of water to and discharge of water from said receptacle, means for admitting oil to said receptacle and thereby causing the discharge of water from said receptacle equal to the volume of oil admitted, means for controlling said valve to maintain the desired feed pressure of water to force the oil toward the point of use, and means for preventing the water from passing to the point of use.

25. An oil filtration device, comprising a pair of closed receptacles arranged to be filled with water to the exclusion of air, a valve controlling the admission of water to said receptacles alternately, a pipe for conducting oil from said receptacles to a point of use and from the point of use to said receptacles, and means for controlling said valve to maintain desired pressure of water to force the oil through said pipe to the point of use.

26. An oil filtration device, comprising a pair of closed receptacles arranged to be filled with water to the exclusion of air, a valve controlling the admission of water to said receptacles alternately, a pipe for conducting oil from said receptacles to a point of use and from the point of use to said receptacles, means for controlling said valve to maintain desired pressure of water to force the oil through said pipe to the point of use, and means for utilizing the force of the water to effect change in the passage of oil from one receptacle to the passage of oil from the other receptacle to the point of use.

27. An oil filtration device, comprising a pair of closed receptacles arranged to be filled with water to the exclusion of air, a valve controlling the admission of water to said receptacles alternately, a pipe for conducting oil from said receptacles to a point of use and from the point of use to said receptacles, means for controlling said valve to maintain desired pressure of water to force the oil through said pipe to the point of use, and means for preventing the water from passing to the point of use of the oil.

JOHN L. FORCE.